Figure 1:
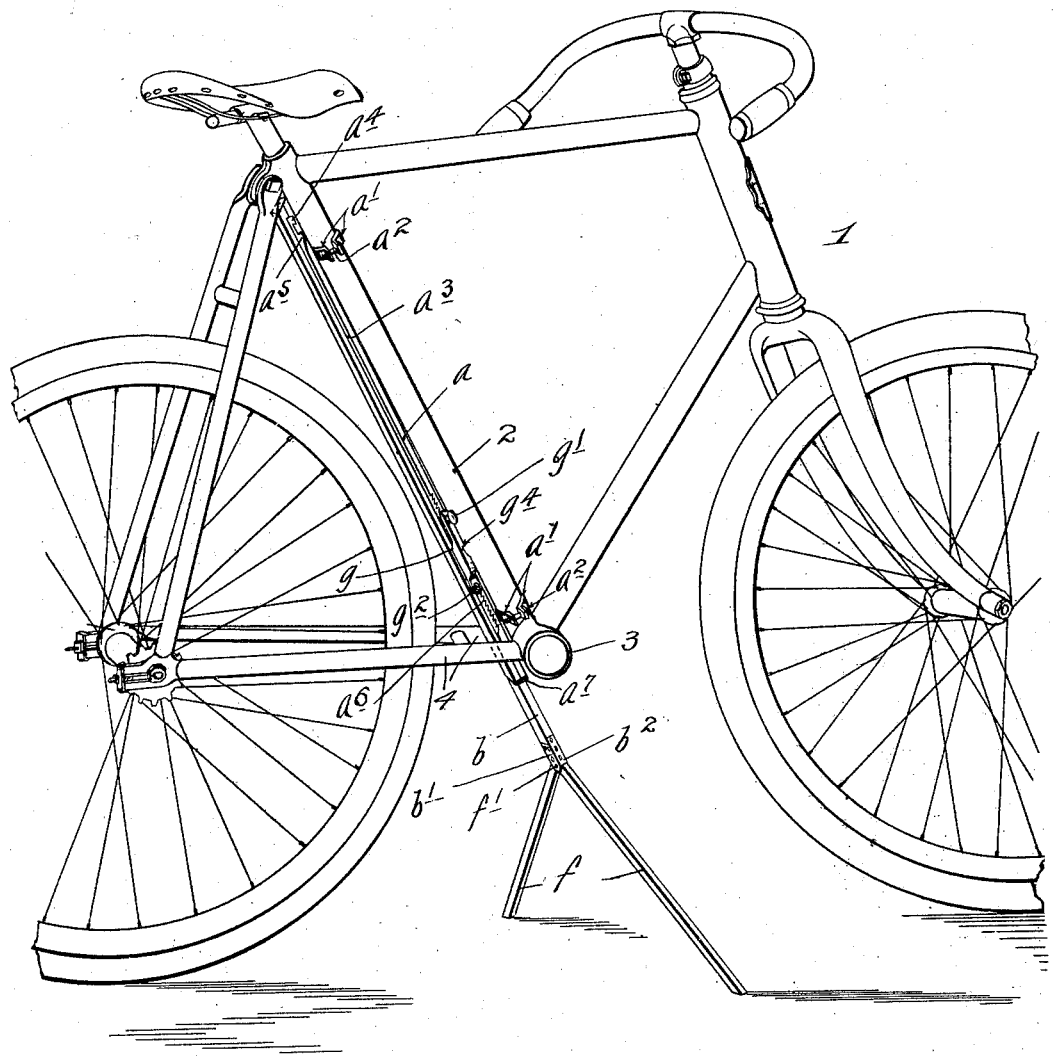

No. 683,463. Patented Oct. 1, 1901.
R. HELMER.
BICYCLE SUPPORT.
(Application filed Oct. 8, 1900.)

(No Model.) 2 Sheets—Sheet 1.

No. 683,463. Patented Oct. 1, 1901.
R. HELMER.
BICYCLE SUPPORT.
(Application filed Oct. 8, 1900.)
(No Model.) 2 Sheets—Sheet 2.
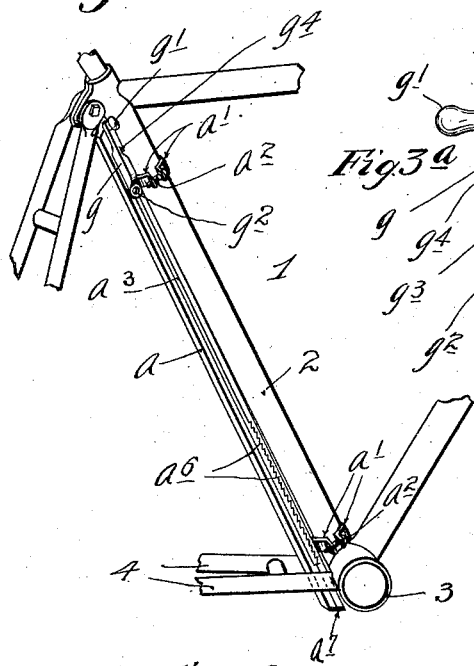
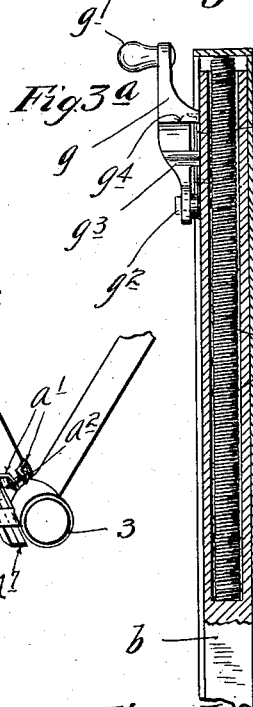
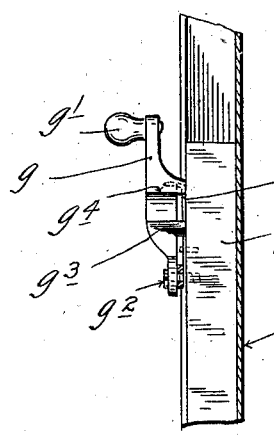
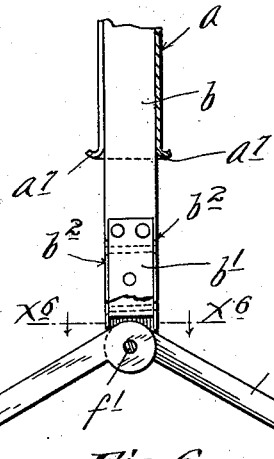
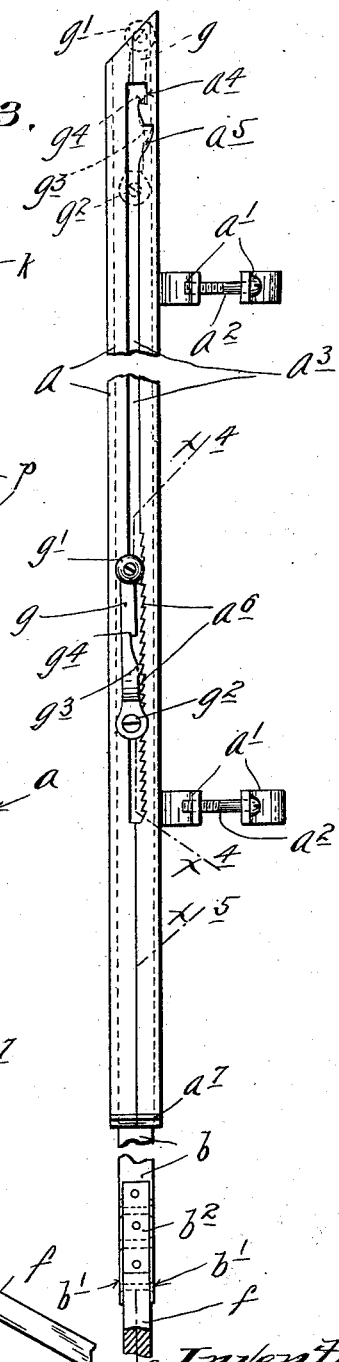
Witnesses
Harry Kilgore
A H Opsahl
Inventor
Robert Helmer
By his Attorneys
Williamson & Merchant

UNITED STATES PATENT OFFICE.

ROBERT HELMER, OF HUTCHINSON, MINNESOTA.

BICYCLE-SUPPORT.

SPECIFICATION forming part of Letters Patent No. 683,463, dated October 1, 1901.

Application filed October 8, 1900. Serial No. 32,341. (No model.)

*To all whom it may concern:*

Be it known that I, ROBERT HELMER, a citizen of the United States, residing at Hutchinson, in the county of McLeod and State of Minnesota, have invented certain new and useful Improvements in Bicycle-Supports; and I do hereby declare the following to be a full, clear, and exact description of the invention, such as will enable others skilled in the art to which it appertains to make and use the same.

My invention has for its object to provide an improved bicycle-support adapted to be attached to a bicycle-frame for use whenever desired to support the machine in a standing position.

To the above end the invention consists of the novel devices and combinations of devices hereinafter described, and defined in the claim.

The invention is illustrated in the accompanying drawings, wherein like characters indicate like parts throughout the several views.

Figure 1 is a perspective view showing a bicycle with one of my improved supports applied thereto, some parts of said bicycle being broken away and others being removed. Fig. 2 is a perspective view showing a portion of a bicycle-frame with the support attached thereto. Fig. 3 is a detail on an enlarged scale, showing in side elevation one of my bicycle-supports detached from the machine, some parts being broken away, Fig. $3^a$ being taken centrally through the upper ends of the sheath $a$ and the plunger which works therein. Fig. 4 is a vertical section taken approximately on the line $x^4$ $x^4$ of Fig. 3. Fig. 5 is a vertical section approximately on the line $x^5$ $x^5$ of Fig. 3, and Fig. 6 is a horizontal section on the line $x^6$ $x^6$ of Fig. 5.

The numeral 1 indicates as an entirety a bicycle of standard construction, of the parts of which it is only necessary for the purposes of this case to designate the upright seat-post 2, the crank-shaft hanger 3, and the horizontal rear tubes 4. In Figs. 1 and 2 the crank-shaft and pedals have been removed for the sake of clearness.

The bicycle-support comprises a long sheath, preferably in the form of a metal tube, which is square in cross-section. This sheath $a$ is rigidly but detachably secured to the seat-post tube 2 of the bicycle-frame by means of two-part clamps $a'$, which clamps are drawn together and onto said tube 2 by means of small nutted bolts $a^2$, one member of each pair of clamps being permanently secured to the said sheath $a$. The sheath $a$ is thus secured, usually to the rear side of the tube 2, in line with the opening between the horizontal rear frame-tubes 4.

The sheath $a$ is formed with a longitudinal slot in its rear side, which runs very nearly the entire length of the same. Near its upper end the slot $a^3$ is formed with lock-notches $a^4$ and $a^5$, and at its rear portion it is formed with ratchet-teeth $a^6$.

A plunger $b$, which, as shown, is square in cross-section, slides freely within the sheath $a$, and to the lower end of this plunger is secured, flush with the sides thereof, a pair of hinge-plates $b'$ and a pair of stop-plates $b^2$. The upper ends of a pair of spreading-legs $f$ are pivoted at $f'$ to the lower ends of the pair of hinge-plates $b'$, their spreading movement being limited by the stop-plates $b^2$, as shown in Fig. 5. The legs $f$ are of such dimensions that when folded they may be drawn upward into the sheath $a$, and they are put under a yielding strain to automatically spread apart when they are withdrawn from the said sheath by means of a torsion-spring $f^2$, shown as located between the overlap pivoted ends of the legs $f$, with one end secured to each leg, as shown in Fig. 6.

A lock-pawl $g$, which, as shown, has a finger-knob $g'$, is pivoted, as shown, by a screw $g^2$, which works through the slot $a^3$ of the sheath $a$ and is screwed into the plunger $b$. This lock-pawl has a projecting beak or lug $g^3$ and an incut lock-shoulder $g^4$. The pawl $g$ is free for both pivotal and for a slight lateral movement and is yieldingly held in its normal position (indicated in Figs. 3 and 4) by a leaf-spring $k$, secured at one end to the plunger $b$ and at its other end to said lock-dog $g$. By reference to Fig. 4 it will be noted that both the lug $g^3$ and lock-shoulder $g^4$ are offset inward from the dog $g$, so that they will normally engage with the ratchet-teeth $a^6$ or with the lock-notches $a^3$ $a^4$, as the case may be.

The character $p$ indicates a long coiled spring which is seated in a deep longitudinal recess in the plunger $b$ and is compressed against the bottom of said recess and the closed upper end of the sheath $a$.

Normally the supporting-legs $f$ are of course drawn into the sheath $a$, as indicated in Fig. 2. In this normal position of the parts the shoulder $g^4$ of the lock-dog $g$ engages the lock-notch $a^4$ of the sheath $a$ and locks the plunger $b$ and legs $f$ within the sheath and holds the spring $p$ compressed. In this same position of the dog $g$ its lug $g^3$ enters the notch $a^5$ of the sheath.

When it is desired to use the support, the lock-dog $g$ is moved pivotally and laterally, so as to release the lug $g^3$ and shoulder $g^4$ from the lock-notches $a^5$ and $a^4$, respectively. The lock-dog may then be released, and the plunger $b$ will be thrown downward under the action of the spring $p$, and the legs $f$ will be spread apart automatically by the spring $f'$, and the separated free ends of the same will be thrown into contact with the ground regardless of all irregularities in the ground. Under this downward movement of the plunger and legs the lug $g^3$ of the dog $g$ will slip over the ratchet-teeth $a^6$, but will remain in engagement with the lowest tooth with which it is brought into contact, thereby locking the supporting-legs and plunger in their operative positions.

It will of course be understood that to restore the parts to their normal positions within the sheath the lock-dog $g$ is given a slight pivotal movement to release its lug $g^3$ from the ratchet-teeth $a^6$ and is then used to draw the plunger and legs upward. As the spread legs are drawn upward they engage the flanged edges $a^7$ at the lower end of the sheath $a$ and are thereby cammed into folded positions. This bicycle-supporter is of small cost and is attached in such manner that it does not encumber the machine. At the same time it is always ready for use and is efficient as a bicycle-supporter.

What I claim, and desire to secure by Letters Patent of the United States, is as follows:

A bicycle-support comprising the sheath $a$ with slot $a^8$ lock-notch $a^4$ and ratchet-teeth $a^6$, of the sliding plunger $b$ working within said sheath, the spring-spread supporting-legs $f$ pivoted to the lower end of said plunger, and working within said sheath when folded, and the pawl $g$ pivoted to said plunger by a connection that works through said slot $a^8$, said pawl $g$ having the lug $g^3$ and shoulder $g^4$ which coöperate respectively with said ratchet-teeth $a^6$ and lock-notch $a^4$, the said pawl further being spring-held for pivotal and lateral movement, substantially as described.

In testimony whereof I affix my signature in presence of two witnesses.

ROBERT HELMER.

Witnesses:
 THOMAS A. PETERS,
 F. D. MERCHANT.